(12) United States Patent
Chen et al.

(10) Patent No.: US 11,879,507 B2
(45) Date of Patent: Jan. 23, 2024

(54) HIGH-STABILITY AND LARGE-TORQUE MAGNETORHEOLOGICAL FLUID CLUTCH

(71) Applicant: ZHEJIANG NORMAL UNIVERSITY, Jinhua (CN)

(72) Inventors: Jinxin Chen, Jinhua (CN); Chongqiu Zhou, Jinhua (CN); Lanpeng Zheng, Jinhua (CN); Chunfu Gao, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 0 days.

(21) Appl. No.: 17/795,227

(22) PCT Filed: May 11, 2022

(86) PCT No.: PCT/CN2022/092098
§ 371 (c)(1),
(2) Date: Jul. 25, 2022

(87) PCT Pub. No.: WO2023/159774
PCT Pub. Date: Aug. 31, 2023

(65) Prior Publication Data
US 2023/0265898 A1    Aug. 24, 2023

(30) Foreign Application Priority Data
Feb. 23, 2022 (CN) .......................... 202210166173.5

(51) Int. Cl.
*F16D 37/02* (2006.01)
*F16D 37/00* (2006.01)

(52) U.S. Cl.
CPC ............ *F16D 37/02* (2013.01); *F16D 37/008* (2013.01); *F16D 2037/001* (2013.01); *F16D 2037/005* (2013.01)

(58) Field of Classification Search
CPC .. F16D 37/008; F16D 37/02; F16D 2037/001; F16D 2037/005; F16D 27/004; F16D 35/00; F16D 35/005
(Continued)

(56) References Cited

U.S. PATENT DOCUMENTS

| 2012/0085613 A1 | 4/2012 | Böse |
| 2021/0138645 A1* | 5/2021 | Larose ................... F16D 37/02 |

FOREIGN PATENT DOCUMENTS

| CN | 208719183 U | 4/2019 |
| CN | 110107615 A | 8/2019 |

(Continued)

OTHER PUBLICATIONS

International Search Report dated Oct. 27, 2022 on a PCT No. PCT/CN2022/092098, filed May 11, 2022. English translation attached.
(Continued)

*Primary Examiner* — Richard M Lorence
(74) *Attorney, Agent, or Firm* — Franklin & Associates International Inc; Matthew F. Lambrinos

(57) ABSTRACT

The present disclosure is a high-stability and large-torque magnetorheological fluid clutch. Firstly, in order to prevent sedimentation of the magnetorheological fluid, blades are installed on the disc body of an input disc. When the clutch operates in a power interruption mode, the blades can stir the magnetorheological fluid, so that the sedimented magnetorheological fluid is uniformly mixed. Secondly, in order to improve the maximum transmission torque of the magnetorheological fluid clutch, an excitation magnetic field is increased in a mode that a permanent magnet and an electromagnet are connected in series. Meanwhile, a third electric push rod is used for pushing the input disc, and the magnetorheological fluid works in a shearing-extruding working mode, so that the yield stress of the magnetorheo- (Continued)

logical fluid is improved. Therefore, the maximum transmission torque of the magnetorheological fluid clutch is improved.

5 Claims, 3 Drawing Sheets

(58) Field of Classification Search
USPC .......................................................... 192/21.5
See application file for complete search history.

(56) References Cited

FOREIGN PATENT DOCUMENTS

| CN | 111577787 | A |   | 8/2020 |          |
|----|-----------|---|---|--------|----------|
| CN | 114439863 | A |   | 5/2022 |          |
| GB | 751382    | A | * | 6/1956 | F16D 37/02 |
| JP | 2016109207| A |   | 6/2016 |          |

OTHER PUBLICATIONS

Written Opinion dated Oct. 27, 2022 on a PCT No. PCT/CN2022/092098, filed May 11, 2022. English translation attached.

* cited by examiner

HIGH-STABILITY AND LARGE-TORQUE MAGNETORHEOLOGICAL FLUID CLUTCH

CROSS REFERENCE TO RELATED APPLICATIONS

This patent application is a national stage, filed under 35 U.S.C. § 371, of International Patent Application No. PCT/CN2022/092098, filed on May 11, 2022, and entitled "HIGH-STABILITY AND LARGE-TORQUE MAGNETORHEOLOGICAL FLUID CLUTCH", which claims the benefit and priority of Chinese Patent Application No. 202210166173.5, filed on Feb. 23, 2022, the disclosure of each of which is incorporated by reference herein in its entirety as part of the present application.

TECHNICAL FIELD

The present disclosure relates to the technical field of clutches, in particular to a high-stability and large-torque magnetorheological fluid clutch.

BACKGROUND ART

The clutch is a device located between power input equipment and power output equipment. Connection and interruption of power between the power input equipment and the power output equipment can be achieved through the clutch. Transmission and interruption of the power are achieved through friction force between friction plates of a traditional mechanical clutch. Due to relative sliding between the friction plates during low-speed and low-torque transmission, abrasion between the friction plates is caused. Therefore, the service life is generally short.

The magnetorheological fluid is an intelligent material and is mainly composed of a base carrier fluid, magnetic particles and an active additive. The magnetorheological fluid is not different from a traditional Newtonian fluid in the absence of the action of an external magnetic field and shows good fluidity. When an external excitation magnetic field is applied, the rigidity and the viscosity of the magnetorheological fluid are rapidly improved within millisecond-level time, so that the increase of the rigidity and the viscosity is in positive correlation with the external excitation magnetic field, namely the rheological properties of the magnetorheological fluid. The rheological properties of the magnetorheological fluid have the advantages of being high in corresponding speed and controllable in height. Therefore, the magnetorheological fluid is applied to multiple fields, and the magnetorheological fluid clutch is one of the fields. The magnetorheological fluid is filled between a driving part and a driven part. The property that the yield stress of the magnetorheological fluid is variable under the action of the magnetic field is used for transmitting and interrupting the power.

At present, the magnetorheological fluid clutch has some problems urgently needing to be solved. Firstly, the magnetic particles in the magnetorheological fluid can settle in long-time storage, the performance of the clutch is affected, and due to the fact that the magnetic particles in the magnetorheological fluid suspend in the base carrier fluid, the settling problem cannot be avoided. Secondly, the yield stress of the magnetorheological fluid is influenced by the magnitude of the magnetic field, and the size of the magnetic field generated by electromagnets is limited, so that the problem that the maximum transmission torque is limited is caused.

SUMMARY

The present disclosure aims to provide a high-stability and large-torque magnetorheological fluid clutch, and aims to solve the problem that a magnetorheological fluid in an existing magnetorheological fluid clutch is easy to sediment and the problem that the torque of the magnetorheological fluid clutch is insufficient.

In order to achieve the purposes, the present disclosure provides the following scheme: the present disclosure provides a high-stability and large-torque magnetorheological fluid clutch, comprising power output equipment, an output disc, an output disc bearing, a left shell, a magnetorheological fluid, an input disc, power input equipment and a right shell, wherein the output disc comprises an output disc main shaft and an output disc body, and the input disc comprises an input disc main shaft and an input disc body; the output disc main shaft is connected with the power output equipment, the output disc is mounted for rotation relative to the left shell through the output disc bearing, a first electric push rod is fixed in the left shell, a push rod of the first electric push rod is connected with a first permanent magnet, and a first electromagnet is fixed to the left shell through an electromagnet support; more than one first electric push rod, more than one first permanent magnet, more than one first electromagnet and more than one electromagnet support are installed in the left shell by taking the rotating direction of the output disc main shaft as the circumferential direction; the input disc main shaft is connected with the power input equipment, an outer ring of the input disc bearing is installed in an input disc bearing sleeve, an inner ring of the input disc bearing is installed on the input disc main shaft, the input disc bearing sleeve and the right shell are assembled in a sliding mode, an end cover is installed at one end of the right shell, and the two ends of a reset spring are fixed to the end cover and the input disc bearing sleeve respectively; more than one reset spring is installed in the input disc bearing sleeve by taking the rotating direction of the input disc main shaft as the circumferential direction; the input disc is mounted for rotation and axial movement relative to the right shell through the input disc bearing and the input disc bearing sleeve; a second electric push rod is fixed in the right shell, a push rod of the second electric push rod is connected with a second permanent magnet, a second electromagnet is fixed in the right shell through an electromagnet support, a third electric push rod is fixed in the right shell, a push rod of the third electric push rod is connected with a thrust bearing, and the thrust bearing is installed on the input disc main shaft; more than one second electric push rod, more than one third electric push rod, more than one second electromagnet, more than one electromagnet support and more than one second permanent magnet are installed in the right shell by taking the rotating direction of the input disc main shaft as the circumferential direction; and the magnetorheological fluid is filled between the output disc body and the input disc body, and a sealing ring is arranged at the junction of the output disc body and the input disc body.

Preferably, an output shaft torque sensor is installed between the output disc main shaft and the power output equipment, and an input shaft torque sensor is installed between the input disc main shaft and the power input equipment.

Preferably, a plurality of blades are installed on the input disc body.

Preferably, when the first permanent magnet and the first electromagnet work in series, the N poles and the S poles of the first permanent magnet and the first electromagnet are opposite to each other; when the second permanent magnet and the second electromagnet work in series, the different magnetic pole faces of the S poles and the N poles of the second permanent magnet and the second electromagnet are opposite; and the different magnetic pole faces of the N poles and the S poles of the first electromagnet and the second electromagnet are opposite.

Preferably, a sliding rail is arranged on the input disc bearing sleeve, a sliding way is arranged on the right shell, the sliding rail of the input disc bearing sleeve is assembled in the sliding way of the right shell in a sliding mode, and the end cover is installed at one end of the sliding way of the right shell.

Compared with the prior art, the present disclosure has the following beneficial technical effects:

Firstly, more than one blade is arranged on the input disc body. When the power input equipment is just started, the clutch is in a power interruption mode, the magnetorheological fluid is in a liquid state at the moment, the blades on the input disc body stir the magnetorheological fluid, and the settled magnetorheological fluid can be uniformly mixed, so that the working stability of the magnetorheological clutch is improved.

Secondly, the permanent magnets are combined with the electromagnets in an excitation mode, so that the range of an excitation magnetic field is enlarged, and the torque transmission range of the magnetorheological clutch is enlarged.

Thirdly, the input shaft torque sensor is installed between the power input equipment and the magnetorheological clutch. The output shaft torque sensor is installed between the power output equipment and the magnetorheological clutch. The input torque of the power input equipment and the output torque of the magnetorheological clutch are detected. The detection value is more accurate compared with a theoretical calculation value and accords with reality. The relation between the input torque and the output torque is compared through a controller, and the working mode of the clutch is changed.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a high-stability and large-torque magnetorheological fluid clutch, and aims to solve the problem that a magnetorheological fluid in an existing magnetorheological fluid clutch is easy to sediment and the problem that the torque of the magnetorheological fluid clutch is insufficient.

To make the foregoing objective, features and advantages of the present disclosure clearer and more comprehensible, the present disclosure is further described in detail below with reference to the attached figures and specific embodiments.

Figure 1:
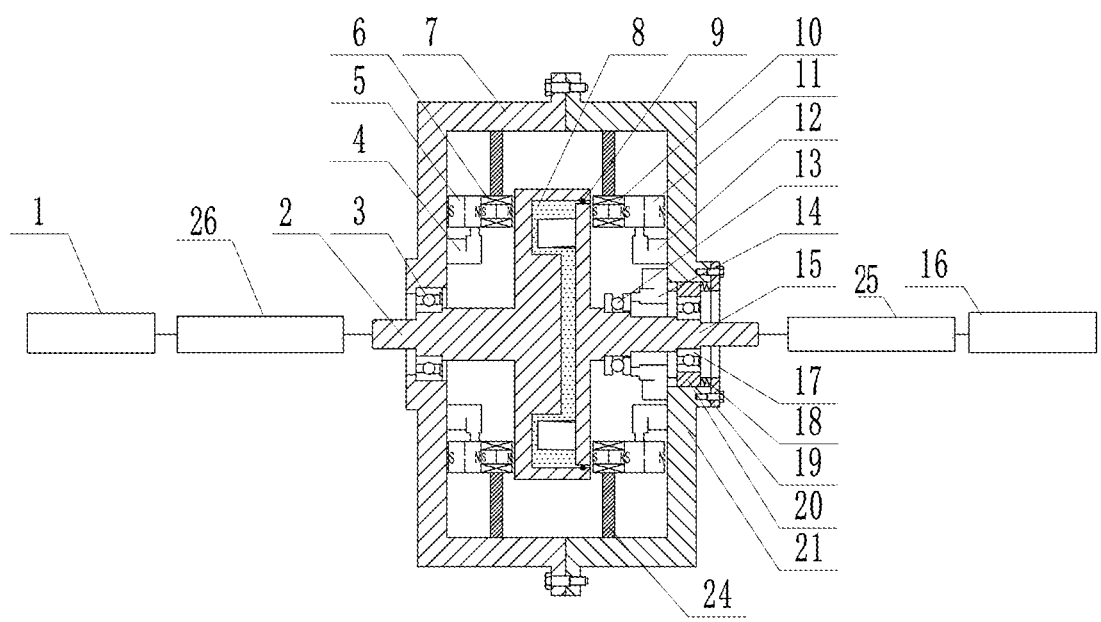
FIG. 1 is a section view I of a high-stability and large-torque magnetorheological fluid clutch.
Figure 2:
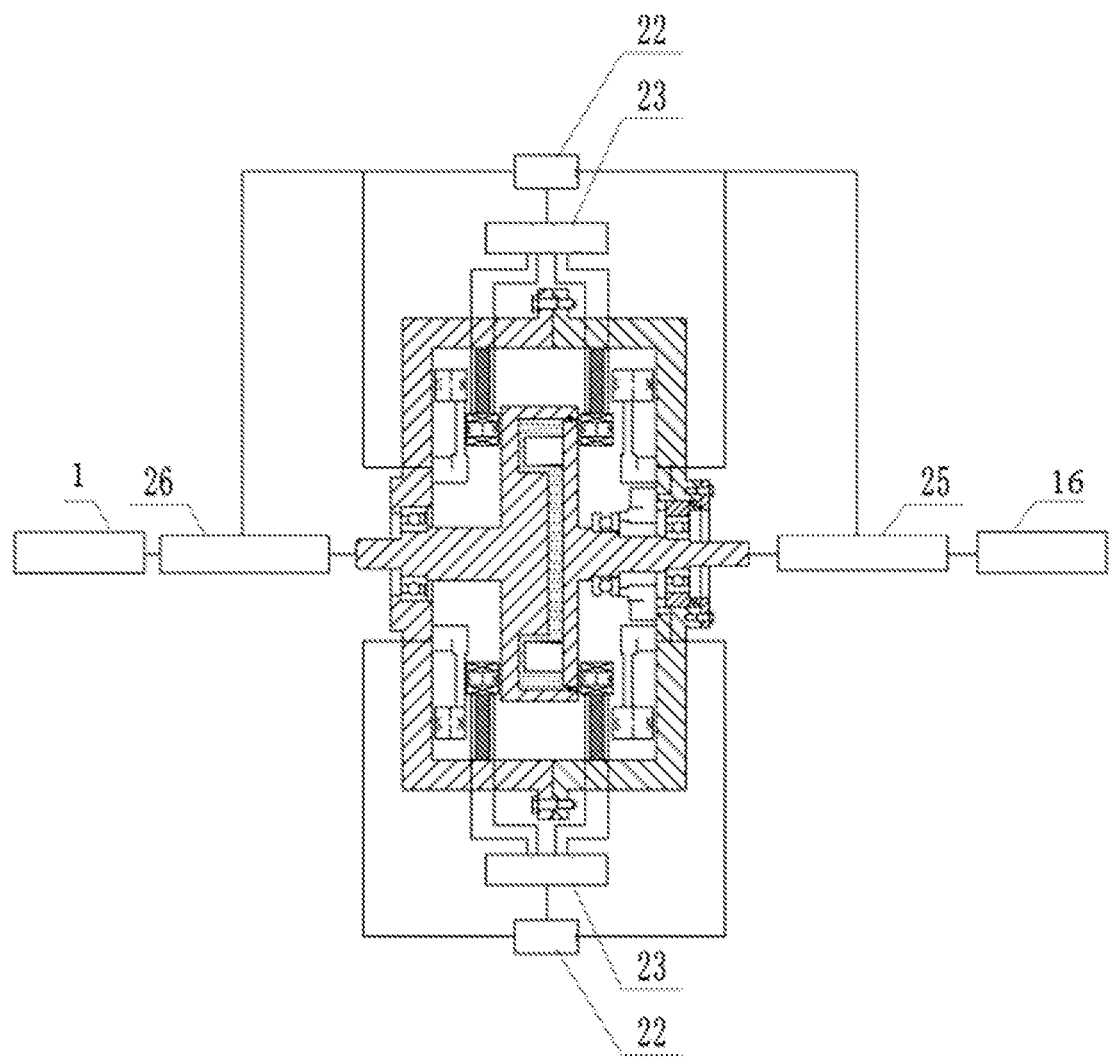
FIG. 2 is a section view II of a high-stability and large-torque magnetorheological fluid clutch.
Figure 3:
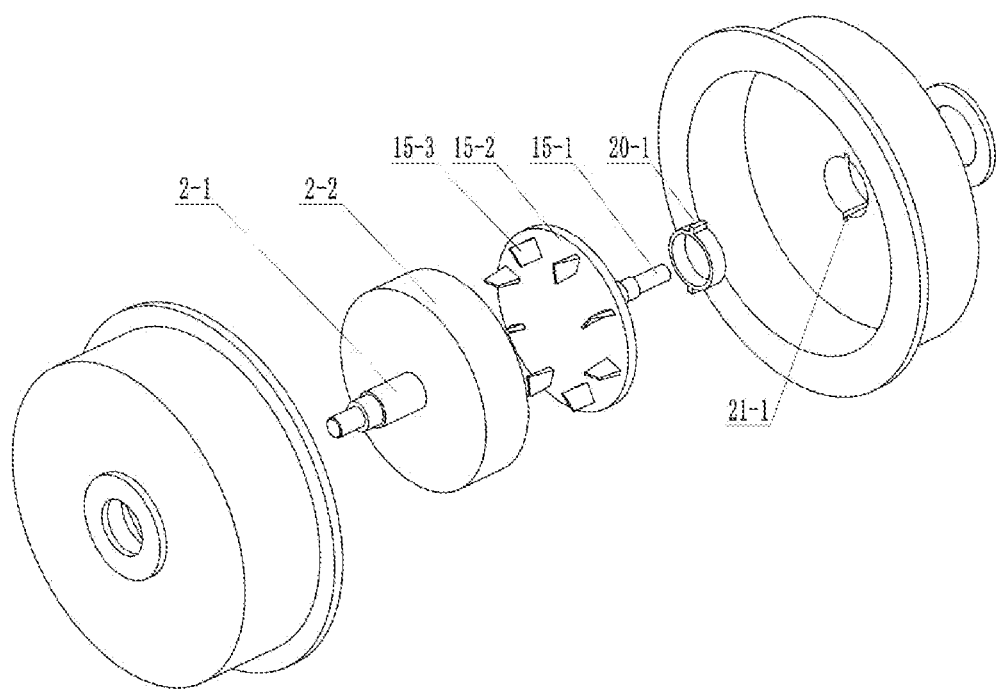
FIG. 3 is an explosive view of parts of a high-stability and large-torque magnetorheological fluid clutch.

As shown in FIG. 1 to FIG. 3, the embodiment provides a high-stability and large-torque magnetorheological fluid clutch. The output disc main shaft 2-1 is connected with the power output equipment 1, and an output shaft torque sensor 26 is installed between the output disc main shaft 2-1 and the power output equipment 1. The output disc 2 is mounted for rotation relative to the left shell 7 through the output disc bearing 3. A first electric push rod 4 is fixed in the left shell 7. A push rod of the first electric push rod 4 is connected with a first permanent magnet 5. A first electromagnet 6 is fixed to the left shell 7 through an electromagnet support 24. More than one first electric push rod 4, more than one first permanent magnet 5, more than one first electromagnet 6 and more than one electromagnet support 24 are installed in the left shell 7 by taking the rotating direction of the output disc main shaft 2-1 as the circumferential direction. The input disc main shaft 15-1 is connected with the power input equipment 16, and an input shaft torque sensor 25 is installed between the input disc main shaft 15-1 and the power input equipment 16. An outer ring of the input disc bearing 17 is installed in an input disc bearing sleeve 20, and an inner ring of the input disc bearing 17 is installed on the input disc main shaft 15-1. A sliding rail 20-1 of the input disc bearing sleeve 20 is installed in a sliding way 21-1 of the right shell 21. An end cover 19 is installed at one end of the sliding way 21-1 of the right shell 21. The two ends of a reset spring 18 are fixed to the end cover 19 and the input disc bearing sleeve 20 respectively. More than one reset spring 18 is installed by taking the rotating direction of the input disc main shaft 15-1 as the circumferential direction. The input disc 15 is mounted for rotation and axial movement relative to the right shell 21 through the input disc bearing 17 and the input disc bearing sleeve 20. A second electric push rod 12 is fixed in the right shell 21. A push rod of the second electric push rod 12 is connected with a second permanent magnet 11. A second electromagnet 10 is fixed in the right shell 21 through an electromagnet support 24. A third electric push rod 14 is fixed in the right shell. A push rod of the third electric push rod 14 is connected with a thrust bearing 13. The thrust bearing 13 is installed on the input disc main shaft 15-1. More than one second electric push rod 12, more than one third electric push rod 14, more than one second electromagnet 10, more than one electromagnet support 24 and more than one second permanent magnet 11 are installed in the right shell 21 by taking the rotating direction of the input disc main shaft 15-1 as the circumferential direction. The magnetorheological fluid 8 is filled between the output disc body 2-2 and the input disc body 15-2. In order to prevent leakage of the magnetorheological fluid, a sealing ring 9 is arranged at the junction of the output disc body 2-2 and the input disc body 15-2.

In order to prevent performance failure of the clutch caused by sedimentation of the magnetorheological fluid, blades 15-3 are installed on the input disc body 15-2. When the clutch works under the working condition of power interruption, namely, the magnetorheological fluid 8 is in a liquid state in the absence of an external excitation magnetic field, the power input equipment 16 drives the input disc 15 to idle, and the blades 15-3 on the input disc 15 stir the magnetorheological fluid 8, so that uniform distribution of magnetic particles in a base carrier fluid is realized.

In order to increase the maximum transmission torque of the magnetorheological clutch, as the maximum yield stress of the magnetorheological fluid 8 is in positive correlation with the size of the external excitation magnetic field, the maximum excitation magnetic field is increased by superposing electromagnets and permanent magnets. The magnetic energy density of the permanent magnets is high. The generated magnetic field intensity is large but not adjustable. The magnitude of the magnetic field intensity generated by the electromagnets is low but can be adjusted through voltage. Therefore, when a large magnetic field is needed, permanent magnets are firstly used for generating a basic magnetic field. Then, the electromagnets and the permanent magnets are connected in series to further increase the magnetic field, and the magnetic field is adjusted by adjusting the voltage of the electromagnets. In the present disclosure, as shown in FIG. 1, the first electromagnet 6 and the first permanent magnet 5 are installed in the left shell 7. The second electromagnet 10 and the second permanent magnet 11 are installed in the right shell 21. When the first electromagnet 6 and the first permanent magnet 5 are connected in series to reinforce the magnetic field, the N poles and the S poles of the first permanent magnet 5 and the first electromagnet 6 are opposite to each other. Similarly, when the second electromagnet 10 and the second permanent magnet 11 are connected in series, the different magnetic pole faces of the S poles and the N poles of the second permanent magnet 11 and the second electromagnet 10 are opposite; and in order to reinforce the magnetic field in the magnetorheological fluid area, the different magnetic pole faces of the N poles and the S poles of the first electromagnet 6 and the second electromagnet 10 are opposite.

In order to increase the adjustable range of the magnetic field, the first electric push rod 4 is installed in the left shell 7, and the second electric push rod 12 is installed in the right shell 21. When a small excitation magnetic field is needed, as shown in FIG. 2, the first electric push rod 4 and the second electric push rod 12 push the first permanent magnet 5 and the second permanent magnet 11 away. At the moment, the excitation magnetic field is generated by the first electromagnet 6 and the second electromagnet 10. A magnetic field in a lower range can be generated only by controlling a PWM direct-current power supply 23 to reduce the voltages of the first electromagnet 6 and the second electromagnet 10 through a controller 22.

In order to increase the maximum transmission torque of the magnetorheological clutch, the third electric push rod 14 is installed in the right shell 21. When high torque needs to be transmitted, the third electric push rod 14 pushes the thrust bearing 13, the thrust bearing 13 transmits thrust to the input disc 15, and the input disc body 15-2 extrudes the magnetorheological fluid 8 to enable the magnetorheological fluid 8 to work under the shearing-extruding working condition. The maximum yield stress of the magnetorheological fluid 8 can be improved under the working condition. When the third electric push rod 14 works, the input disc 15 slightly moves in the axial direction. In order to meet the requirement on the movement of the input disc 15 in the axial direction, the input disc bearing 17 is installed on the input disc bearing sleeve 20. The input disc bearing sleeve 20 is provided with the sliding rail 20-1 structure and installed in the sliding way 21-1 structure of the right shell 21 to achieve slight movement in the axial direction.

The using method is as follows.

The present disclosure provides a high-stability and large-torque magnetorheological fluid clutch which has five working modes, namely a power interruption mode, a low-torque power transmission mode, a medium-torque power transmission mode, a high-torque power transmission mode and a variable-torque working mode.

When the power input equipment 16 is just started, the clutch works in a power interruption mode. As shown in FIG. 2, the first electric push rod 4 and the second electric push rod 12 push the first permanent magnet 5 and the second permanent magnet 11 to be far away from the first electromagnet 6 and the second electromagnet 10. The controller 22 controls the PWM direct-current power supply 23 to stop supplying power to the first electromagnet 6 and the second electromagnet 10. At the moment, the magnetorheological fluid 8 is in a liquid state in the absence of an external excitation magnetic field. The power input equipment 16 drives the input disc 15 to rotate. The blades 15-3 on the input disc body 15-2 stir the magnetorheological fluid 8, so that settled magnetic particles in the magnetorheological fluid 8 are uniformly distributed in the base carrier fluid. Due to the fact that the magnetorheological fluid 8 is in a liquid state, the input disc 15 cannot drive the output disc 2 to rotate. At the moment, power between the power input equipment 16 and the power output equipment 1 is interrupted.

When power connection between the power input equipment 16 and the power output equipment 1 needs to be achieved, the clutch starts a low-torque power transmission mode firstly. At the moment, the PWM direct-current power supply 23 is controlled by the controller 22 to supply power to the first electromagnet 6 and the second electromagnet 10. The first electromagnet 6 and the second electromagnet 10 generate the excitation magnetic field to solidify the magnetorheological fluid 8. The yield stress of the magnetorheological fluid 8 is increased. At the moment, the input disc 15 transmits power to the output disc 2 through the magnetorheological fluid 8. Meanwhile, the controller 22 detects the torque values of the input shaft torque sensor 25 and the output shaft torque sensor 26. When the torque value of the input shaft torque sensor 25 is equal to the torque value of the output shaft torque sensor 26, it is indicated that the power is completely transmitted. When the torque value of the input shaft torque sensor 25 is larger than the torque value of the output shaft torque sensor 26, it is indicated that the yield stress of the magnetorheological fluid 8 is insufficient and power is partially transmitted at the moment. If complete power transmission needs to be achieved, the controller 22 should control the PWM direct-current power supply 23 to increase output voltage and increase the excitation magnetic field generated by the first electromagnet 6 and the second electromagnet 10. Therefore, the yield stress of the magnetorheological fluid 8 is increased to increase the output torque. When the output voltage of the PWM direct-current power supply 23 reaches the maximum value, if the torque value of the input shaft torque sensor 25 is larger than the torque value of the output shaft torque sensor 26, the clutch enters a medium-torque power transmission mode.

When the clutch enters a medium-torque power transmission mode, the controller 22 controls the first electric push rod 4 and the second electric push rod 12 to push the first permanent magnet 5 and the second permanent magnet 11 to be close to the first electromagnet 6 and the second electromagnet 10. At the moment, the first permanent magnet 5 and the first electromagnet 6 are in a series working mode, and the second permanent magnet 11 and the second electromagnet 10 are in a series working mode. At the moment, the controller 22 controls the output voltage of the PWM direct-current power supply 23 to be zero and compares the torque value of the input shaft torque sensor 25 with the torque value of the output shaft torque sensor 26. When the torque value of the input shaft torque sensor 25 is equal to the torque value of the output shaft torque sensor 26, power is completely transmitted. When the torque value of the input shaft torque sensor 25 is larger than the torque value of the output shaft torque sensor 26, power is partially transmitted. If complete power transmission needs to be achieved, the controller 22 controls the PWM direct-current power supply 23 to increase the output voltage and increase the excitation magnetic field to enable the torque value of the input shaft torque sensor 25 to be equal to the torque value of the output shaft torque sensor 26. If the PWM direct-current power supply 23 reaches the maximum output voltage, the torque value of the input shaft torque sensor 25 is still larger than that of the output shaft torque sensor 26, and the clutch enters a high-torque power transmission mode.

When the clutch enters a high-torque power transmission mode, the controller 22 controls the third electric push rod 14 to push the input disc 15 to be close to the output disc 2. The input disc body 15-2 extrudes the magnetorheological fluid 8, so that the magnetorheological fluid 8 works in a shearing-extruding working state. The extrusion amount of the magnetorheological fluid 8 can be controlled by controlling the pushing stroke of the third electric push rod 14 through the controller 22. When the extrusion amount of the magnetorheological fluid 8 is increased, the yield stress of the magnetorheological fluid 8 is increased, and the maximum transmission torque of the clutch is increased at the moment. When the extrusion amount of the magnetorheological fluid 8 reaches the maximum, the clutch reaches the maximum transmission torque. When the clutch exits from a high-torque power transmission mode, the controller 22 controls the third electric push rod 14 to retract, and the input disc 15 is far away from the output disc 2 under the action of the reset spring 18.

When the clutch works in a low-torque power transmission mode, a medium-torque power transmission mode and a high-torque power transmission mode, the clutch can reduce the output voltage of the PWM direct-current power supply 23 through the controller 22, and the excitation magnetic field of the first electromagnet 6 and the second electromagnet 10 is reduced. Therefore, the yield stress of the magnetorheological fluid 8 is reduced, and the torque obtained by the output disc 2 is smaller than the torque input by the input disc 15, so that the clutch works in a variable-torque working mode, and the variable-torque function is realized.

Reference signs: 1, power output equipment; 2, output disc; 3, output disc bearing; 4, first electric push rod; 5, first permanent magnet; 6, first electromagnet; 7, left shell; 8, magnetorheological fluid; 9, sealing ring; 10, second electromagnet; 11, second permanent magnet; 12, second electric push rod; 13, thrust bearing; 14, third electric push rod; 15, input disc; 16, power input equipment; 17, input disc bearing; 18, reset spring; 19, end cover; 20, input disc bearing sleeve; 21, right shell; 22, controller; 23, PWM direct-current power supply; 24, electromagnet support; 25, input shaft torque sensor; 26, output shaft torque sensor; 2-1, output disc main shaft; 2-2, output disc body; 15-1, input disc main shaft; 15-2, input disc body; 15-3, blade; 20-1, sliding rail; and 21-1, sliding way It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A high-stability and large-torque magnetorheological fluid clutch, comprising power output equipment, an output disc, an output disc bearing, a left shell, a magnetorheological fluid, an input disc, power input equipment and a right shell, wherein the output disc comprises an output disc main shaft and an output disc body, and the input disc comprises an input disc main shaft and an input disc body; the output disc main shaft is connected with the power output equipment, the output disc is mounted for rotation relative to the left shell through the output disc bearing, a first electric push rod is fixed in the left shell, a push rod of the first electric push rod is connected with a first permanent magnet, and a first electromagnet is fixed to the left shell through an electromagnet support; more than one first electric push rod, more than one first permanent magnet, more than one first electromagnet and more than one electromagnet support are installed in the left shell by taking a rotating direction of the output disc main shaft as a circumferential direction;

the input disc main shaft is connected with the power input equipment, an outer ring of an input disc bearing is installed in an input disc bearing sleeve, an inner ring of the input disc bearing is installed on the input disc main shaft, the input disc bearing sleeve and the right shell are assembled in a sliding mode, an end cover is installed at one end of the right shell, and two ends of a reset spring are fixed to the end cover and the input disc bearing sleeve respectively; more than one reset spring is installed in the input disc bearing sleeve by taking a rotating direction of the input disc main shaft as the circumferential direction; the input disc is mounted for rotation and axial movement relative to the right shell through the input disc bearing and the input disc bearing sleeve; and a second electric push rod is fixed in the right shell, a push rod of the second electric push rod is connected with a second permanent magnet, a second electromagnet is fixed in the right shell through an electromagnet support, a third electric push rod is fixed in the right shell, a push rod of the third electric push rod is connected with a thrust bearing, and the thrust bearing is installed on the input disc main shaft; and more than one second electric push rod, more than one third electric push rod, more than one second electromagnet, more than one electromagnet support and more than one second permanent magnet are installed in the right shell by taking the rotating direction of the input disc main shaft as the circumferential direction; and the magnetorheological fluid is filled between the output disc body and the input disc body, and a sealing ring is arranged at a junction of the output disc body and the input disc body.

2. The high-stability and large-torque magnetorheological fluid clutch according to claim 1, wherein an output shaft torque sensor is installed between the output disc main shaft and the power output equipment, and an input shaft torque sensor is installed between the input disc main shaft and the power input equipment.

3. The high-stability and large-torque magnetorheological fluid clutch according to claim 1, wherein a plurality of blades are installed on the input disc body.

4. The high-stability and large-torque magnetorheological fluid clutch according to claim 1, wherein when each of the more than one first permanent magnet and a corresponding one of the more than one first electromagnet work in series, the N poles and the S poles of the each of the more than one first permanent magnet and the corresponding one of the more than one first electromagnet are opposite to each other; when each of the more than one second permanent magnet and a corresponding one of the more than one second electromagnet work in series, different magnetic pole faces of the S poles and the N poles of the each of the more than one second permanent magnet and the corresponding one of the more than one second electromagnet are opposite; and different magnetic pole faces of the N poles and the S poles of the each of the more than one first electromagnet and the corresponding one of the more than one second electromagnet are opposite.

5. The high-stability and large-torque magnetorheological fluid clutch according to claim 1, wherein a sliding rail is arranged on the input disc bearing sleeve, a sliding way is arranged on the right shell, the sliding rail of the input disc bearing sleeve is assembled in the sliding way of the right shell in a sliding mode, and the end cover is installed at one end of the sliding way of the right shell.

* * * * *